April 13, 1965 SHOE ITO 3,177,762
ELECTRIC EXPOSURE METER CAPABLE OF READING PICTURE CONTRAST
Filed June 20, 1962
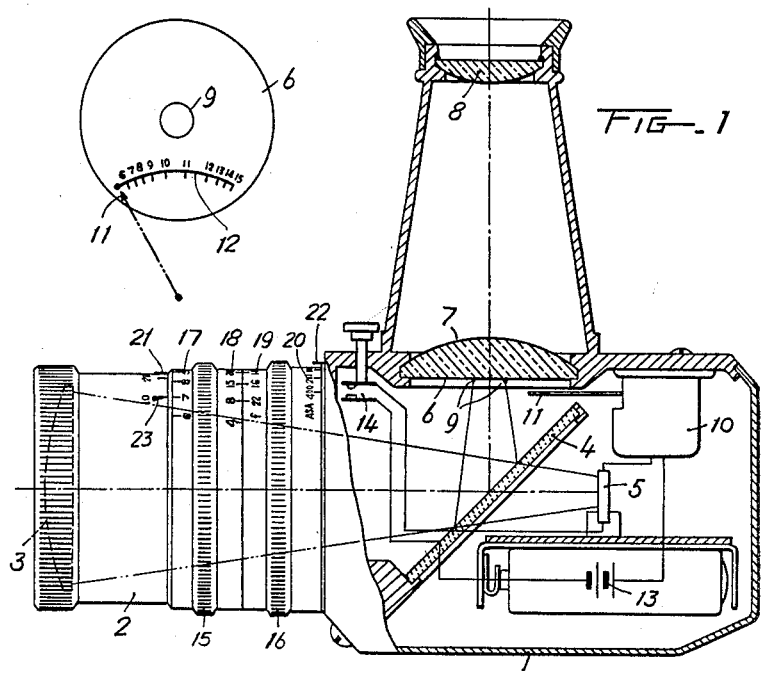
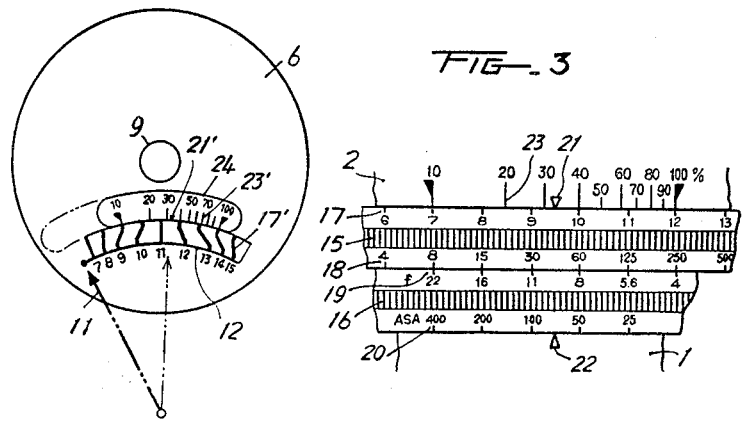
INVENTOR
SHOE ITO
BY
ATTORNEY

United States Patent Office 3,177,762
Patented Apr. 13, 1965

3,177,762
ELECTRIC EXPOSURE METER CAPABLE OF READING PICTURE CONTRAST
Shoe Ito, Tokyo, Japan, assignor to Asahi Optical Co., Ltd., Tokyo, Japan, a corporation of Japan
Filed June 20, 1962, Ser. No. 203,921
4 Claims. (Cl. 88—23)

The present invention relates generally to electric exposure meters and more particularly to electric exposure meters of the type in which, while the operator views an image of an object, the light from only a desired small area of said object is received by a photoelectric element and the brightness of said small area is measured or the light value of this area on exposure is directly determined.

It is an object of the present invention to provide an exposure meter of the above type which can accurately predetermine other parts of a picture reproducible effectively as contrast when proper exposure has been given to a specific part or small area of an object to be photographed.

It is another object of the present invention to provide an exposure meter capable of accurately indicating the light value, or intensity from a specific small area of an object to be photographed and also clearly indicating which part of the object to be photographed has that light value.

Yet another object of the present invention is to provide an exposure meter capable of accurately determining the lens aperture and shutter speed for an exposure which will dependably give desired highlight and shadow gradients to a film when the latter is subjected to predetermined processing conditions during printing and developing of the film.

Still another object of the present invention is to provide an exposure meter capable of accurately predetermining the reproducible contrast in reproduction of a picture prior to shooting of a scene by a television camera so that the illumination of a scene can be adjusted to ensure reproduction of all desired portions of the scene.

The foregoing and other objects of the present invention are attained by providing an exposure meter of the described character with a contrast scale which is relatively displaceable to the light value or intensity scale and has a length equal to the distance, along the light value scale, between light values for the highlight and shadow of reproducible contrast on a photosensitive material to be used.

The above objects and advantages of the present invention will become apparent from the following description which is to be read in conjunction with the accompanying drawing in which:

FIG. 1 is a schematic side elevational view of an embodiment of the electric exposure meter according to this invention, and which is shown partly broken away and in section;

FIG. 2 is a plan view of the focusing plate thereof;

FIG. 3 is a fragmentary developed plan view of the several scales provided on the exposure meter in accordance with this invention; and FIG. 4 is an enlarged plan view of the focal plate of a modification in which the contrast scale is provided on the focal plate.

Referring to the drawing in detail, it will be seen that the reference numeral 1 designates the body of the exposure meter which has a barrel 2 attached to the front end of said body and suitably carrying an objective lens 3. A semi-transparent mirror 4 is obliquely mounted in the body by any suitable supporting means, and a photoelectric element consisting of, for example, a CdS semiconductor, is also mounted within the body and is disposed in the focal plane of lens 3 behind the mirror 4 so that a minor portion of the light flux from the lens 3 will impinge upon it. A focusing plate 6 is fitted in an opening formed on the upper surface of the body, and is disposed in the focal plane of the path of the reflected light from the semitransparent mirror 4. A field lens 7 is conveniently integrally formed with the focusing plate 6 and cooperates with an eye-piece lens 8 through which the operator peers at the focusing plate 6 to provide an erect, magnified image. A mark 9, for example, in the form of a circle, is provided on the focusing plate 6 to indicate the range or area of light flux passing through lens 3 that is received by the photoelectric element 5. An ammeter 10 is connected with the circuit of photoelectric element 5 and has a pointer 11 arranged adjacent to the focusing plate 6 so as to appear in the same field of vision as mark 9 and move along a scale 12 also provided on the focusing plate 6.

The circuit for the photoelectric element 5 further includes a power source 13, for example, in the form of a battery, and a switch 14 which is normally open, as shown, and adapted to be manually depressed so as to complete the circuit.

The scale 12 on plate 6 is calibrated for light value or intensity so that, when switch 14 is closed, the pointer 11 will indicate, on scale 12, the value or intensity of the light at the limited or small part of the object defined within the mark 9.

The illustrated exposure meter further includes rings 15 and 16 which are mounted on barrel 2 for rotation relative to the latter and each other. The ring 15 has a scale 17 along one edge which has equally spaced graduations representing light values or intensities and is hereinafter referred to as the LV scale. The other edge of ring 15, that is, the edge adjacent ring 16, is provided with a scale 18 calibrated to represent shutter speeds. The edge of ring 16 adjacent ring 15 has a scale 19 extending therealong and calibrated to represent apertures or f/ stops, and the other edge of ring 16 has a scale 20 extending therealong calibrated to represent A.S.A. numbers, that is, the sensitivity or speed rating of the film, or the image orthicon tube of the television camera being used. Fixed index marks or points 21 and 22 are provided on the barrel 2 and the body 1 to cooperate with the LV scale 17 on ring 15 and the A.S.A. number scale 20 on ring 16, respectively.

The above described arrangement is known, and provides a spot exposure meter, that is, a meter operative to provide a range of combinations of shutter speed and aperture or diaphragm opening suitable for the light value of a particular small area or part of the subject to be photographed.

In using such known spot exposure meter, first of all the objective lens 3 is pointed at a subject to be photographed while peering at the focusing plate 6 through the eye-piece lens 8, and the image of the principal part or area of said subject is brought inside the circular mark 9. Upon closing the switch 14 of the photoelectric element circuit the light value or LV number of such principal area is indicated by the pointer 11 on the LV scale 12. The rotory ring 15 is then turned until its LV scale 17 is set so that the same light valve thereon, as that read on scale 12, meets standard index point 21. Thereafter, the range of permissible combinations of shutter speeds and apertures or diaphragm openings may be read from the scales 18 and 19. The sensitivity scale 20 is preset by setting the sensitivity graduation corresponding to the sensitivity of the photosensitive material to be used next to the standard index point 22 by turning the rotary ring 16.

Although the known spot exposure meter is effective to indicate the desirable exposure conditions for photographing any selected area or part of a subject, as described above, it will be apparent that a subject generally consists of parts of different brightness, and that the ratio between the brightest and darkest parts of the subject is frequently large. On the other hand, a photosensitive material is limited as to range of different brightnesses that it can closely reproduce. More specifically, existing photographic materials or television image orthicons are limited to a brightness ratio (ratio of the darkest to brightest parts of the subject) in the range between 1:30 and 1:32. Consequently, when the proper exposure is selected for a spot or small part of a subject by employing the existing exposure meter, as described above, other parts of the subject having a brightness outside of the mentioned range will appear as totally dark or totally light areas and will not be clearly reproduced in the photograph. Thus, in photographing a subject, it is essential to know before hand those parts which are not reproducible, or to determine, in terms of numerical values, the degree of reproducibility of the several parts of the subject so that, if necessary or desired, corrective lighting adjustments or additions can be made. In the case of the described known spot exposure meter, one measures the light values of several different areas or parts of the subject, and the areas reproducible as contrast are determined by comparing the respective light values, but this requires calculation which is inconvenient.

In accordance with this invention, the above described spot exposure meter is improved so that, besides giving the proper exposure conditions for the light value of the precise area of the subject viewed within the mark 9, it also indicates the range of light values for other areas of the subject that will be reproducible as effective contrast on the photograph. In order to achieve the foregoing, a contrast scale 23 is further provided on the barrel 2 adjacent the edge of ring 15 having the LV scale 17 extending therealong, and such contrast scale 23 is located so that the index point 21 lies at the mid-point thereof. The extent of the contrast scale 23 at either side of the index point 21 is such that the ends of the contrast scale 23 indicate, on the LV scale 17, the upper and lower limits, respectively, of light value that will be reproducible, as contrast, in a photograph taken under the exposure conditions indicated by the meter, as described above, for the light value on scale 17 lying next to index point 21.

Since five graduations on the LV scale 17 correspond to a brightness ratio of L;30, and since the upper and lower limits of brightness that are reproducible in any photograph have a brightness ratio of L;30, the contrast scale 23 is given a length, between its ends, equal to the distance along the LV scale 17 covered by five graduations of the latter. Although the contrast scale 23 may have any desired graduations indicating degrees of contrast intermediate the upper and lower limits, the scale 23 on the illustrated embodiment of this invention has graduations corresponding to the step wedge of gray scale which is employed as a contrast standard in photography and television. Such standard gray scale establishes 10 steps of brightness from the brightest part, which is stipulated as 100%, to the darkest part, which is stipulated as 10%, with the center of the scale being the standard brightness. The scale 23 is shown having loarithmic graduations, as the LV scale with which it cooperates has equally spaced graduations representing light values which vary in accordance with an arithmetical progression. To explain the use of the contrast scale 23 on the exposure meter described above, reference will be made, first of all to the case of ordinary use. In this case the light value on the LV scale 17 corresponding to that indicated on the scale 12 for the precise area of the subject within mark 9 is set next to the standard index point 21 or graduation 33% of the contrast scale 23, and the highest and lowest reproducible light values are read on the LV scale 17 next to the 100% or 10% graduations of the scale 23. Then while peering at the focusing plate 6 through eye-piece lens 8, other parts of the subject to be photographed are brought inside the mark 9 and the indication of pointer 11 on scale 12 is read for each of these other parts whereby it becomes clear whether or not each of these other parts of the subject will be reproduced in the picture. Further, each reading on scale 12 can be converted to a contrast indication by scales 17 and 23, so that the degrees of contrast of all parts of the subject can be determined prior to photographing. If the LV number read on the scale 12 for any part of the subject falls outside the permissible range indicated on scale 17 by the ends of scale 23, then the illumination of such part or parts can be adjusted to ensure that all parts of the subject are reproducible. In the case of taking certain types of photographs, for example, in portraiture where the principal part comprises the face of a person, it is generally understood from experience that the brightness of the face should lie at the 60% point between the brightest and darkest areas of the photograph in order to produce the best picture effect. In such case the measured light value indicated on scale 12 for the face of the subject is set on scale 17 next to 60% on the contrast scale 23 and the upper and lower limits of the light values for the rest of the subject are then read on scale 17 opposite the ends of scale 23.

In the embodiment described above the contrast scale 23 is provided on the exterior of the barrel 2 adjacent to the LV scale 17 on the rotary ring 15. But as shown in FIG. 4, a contrast scale 23' may be provided adjacent to the LV scale 12 on the focusing plate 6. In this case, however, since it is usual that the graduations of the LV scale 12 cooperating with pointer 11 are not equally spaced apart, such graduation lines are extended to an auxiliary scale 17' having equally spaced graduations. The contrast scale 23' with logarithmic graduations and a standard index point 21' at the center is provided on a plate 24 which is relatively displaceable along the auxiliary scale 17 on plate 6. For an effective contrast reading in this case the supporting plate 24 is moved and the index point 21' of the middle part of the scale 23' or the graduation of a desired contrast value of the principal part to be photographed is set to the light value indicated by the pointer 11 at time of measurement. Then the ends of scale 23' indicate the upper and lower limits of the light value on scale 12–17' which are reproducible.

When the exposure meter according to this invention is used, the conditions for the development of the film are predetermined, for example, a fixed gamma (e.g. 0.66), a highlight gradient of 1.20 and shadow gradient of 0.4, in the case of negative film, whereby a film corresponding thereto can be reliably made at will. Thus the developing conditions of such films and the printing and developing conditions in the production of positive films can always be fixed and thereby greatly simplify the production. In the operation of television cameras, it has been the practice to adjust image contrast while observing the wave form of the output voltage of the monitor. However, through the use of the exposure meter embodying this invention, it is possible to achieve the desired contrast by adjusting lighting before shooting, so that, during actual shooting, full attention can be directed to achieving the most effective and artistic results.

What I claim is:

1. In an electric exposure meter having an optical system with an eye-piece through which a subject to be photographed can be viewed, a photoelectric element positioned to receive light through the optical system from only a desired small area of the subject being viewed, means in the optical system visible through said eye-piece to indicate the small area of the subject from which the photoelectric element receives light, means controlled by said photoelectric element, including an LV scale, to provide an indication also visible through said eye-piece of the light value of said small area of the subject; the improvement comprising a contrast scale on a member which is joined to a part of the exposure meter and relatively movable with respect to said part in the direction along an adjacent LV scale, said contrast scale including an index point and graduations extending in opposite directions from said index point to the ends of said contrast scale, said ends of the contrast scale being spaced apart along said adjacent LV scale to lie opposite light values on the latter which represent the limits of brightness and darkness, respectively, of other areas of the subject that are reproducible under exposure conditions selected for the indicated light value of said small area of the subject when said indicated light value is set on said adjacent LV scale next to said index point on the contrast scale.

2. An electric exposure meter as in claim 1; wherein said member having the contrast scale thereon is in the form of a barrel in which a lens element of said optical system is mounted, and said part of the exposure meter having said LV scale thereon is in the form of a ring turnable on said barrel.

3. An electric exposure meter as in claim 1; wherein said part of the exposure meter having said adjacent LV scale thereon is a transparent member disposed in the field of vision of the eyepiece, and said transparent member further has a mark thereon to define said means for indicating the small area of the subject from which the photoelectric element receives light; and wherein said member having the contrast scale thereon is movable relative to said transparent member in said field of vision of the eye-piece.

4. An electric exposure meter as in claim 1;

wherein said adjacent LV scale has equally spaced graduations representing successive numbers of light value, and said contarst scale has logarithmic graduations and the distance between said ends of the contrast scale corresponds to a brightness ratio of approximately 1:30.

References Cited by the Examiner
UNITED STATES PATENTS

| 2,183,217 | 12/39 | Goldsmith | 95—10 |
| 2,330,613 | 9/43 | Nuchterlein | 88—23 |
| 2,401,691 | 6/46 | Luboshez | 88—2.7 |
| 2,934,996 | 5/60 | Muse | 88—23 |

FOREIGN PATENTS

| 813,465 | 6/37 | France. |
| 472,147 | 9/37 | Great Britain. |

JEWELL H. PEDERSEN, *Primary Examiner.*